(12) United States Patent
Robertson et al.

(10) Patent No.: US 9,305,060 B2
(45) Date of Patent: Apr. 5, 2016

(54) SYSTEM AND METHOD FOR PERFORMING CONTEXTUAL SEARCHES ACROSS CONTENT SOURCES

(76) Inventors: Steven L. Robertson, Tampa, FL (US); Ugo Riboni, Cesano Maderno (IT); Joseph Born, Lincolnwood, IL (US)

( * ) Notice: Subject to any disclaimer, the term of this patent is extended or adjusted under 35 U.S.C. 154(b) by 2093 days.

(21) Appl. No.: 12/176,233

(22) Filed: Jul. 18, 2008

(65) Prior Publication Data

US 2010/0017366 A1    Jan. 21, 2010

(51) Int. Cl.
*G06F 17/30* (2006.01)

(52) U.S. Cl.
CPC .... *G06F 17/30528* (2013.01); *G06F 17/30867* (2013.01)

(58) Field of Classification Search
CPC ............... G06F 17/30528; G06F 17/30867
USPC ............... 707/706, 726, 708; 725/86, 98
See application file for complete search history.

(56) References Cited

U.S. PATENT DOCUMENTS

| | | | |
|---|---|---|---|
| 6,121,968 A | 9/2000 | Arcuri et al. | 345/825 |
| 6,385,596 B1 | 5/2002 | Wiser et al. | 705/51 |
| 6,425,609 B2 | 7/2002 | Cheng | 292/5 |
| 7,243,307 B2 | 7/2007 | Gao et al. | 715/744 |
| 7,577,582 B1* | 8/2009 | Ojha et al. | 705/26.3 |
| 7,747,620 B2* | 6/2010 | Beaupre | 707/734 |
| 2002/0002039 A1 | 1/2002 | Qureshey et al. | 455/344 |
| 2002/0070979 A1 | 6/2002 | Hong | 345/814 |
| 2003/0084056 A1 | 5/2003 | De Anna et al. | 707/100 |
| 2003/0229537 A1 | 12/2003 | Dunning et al. | 705/10 |
| 2006/0085825 A1* | 4/2006 | Istvan et al. | 725/86 |
| 2006/0242126 A1* | 10/2006 | Fitzhugh | 707/3 |
| 2007/0250195 A1* | 10/2007 | Rhoads et al. | 700/94 |
| 2008/0201748 A1* | 8/2008 | Hasek et al. | 725/98 |
| 2008/0235209 A1* | 9/2008 | Rathod et al. | 707/5 |

\* cited by examiner

*Primary Examiner* — Rehana Perveen
*Assistant Examiner* — Tiffany Thuy Bui
(74) *Attorney, Agent, or Firm* — Clifford H. Kraft

(57) ABSTRACT

A request is received from a user to perform a contextual search based on a media file or metadata for the media file. A type of the media file is determined. A contextual search menu is presented to the user. A selected contextual search query type selected from the contextual search menu is received from the user. One or more search modules each associated with one or more content sources are queried to determine which one or more search modules can perform the selected contextual search query type. A request is generated for one or more search modules that can perform the selected contextual search query type to perform the selected contextual search query type against one or more selected content sources associated with the one or more search modules. Search results are received from the one or more search modules, wherein the search results include links to one or more files associated with the one or more content sources. The search results are displayed to the user.

21 Claims, 10 Drawing Sheets

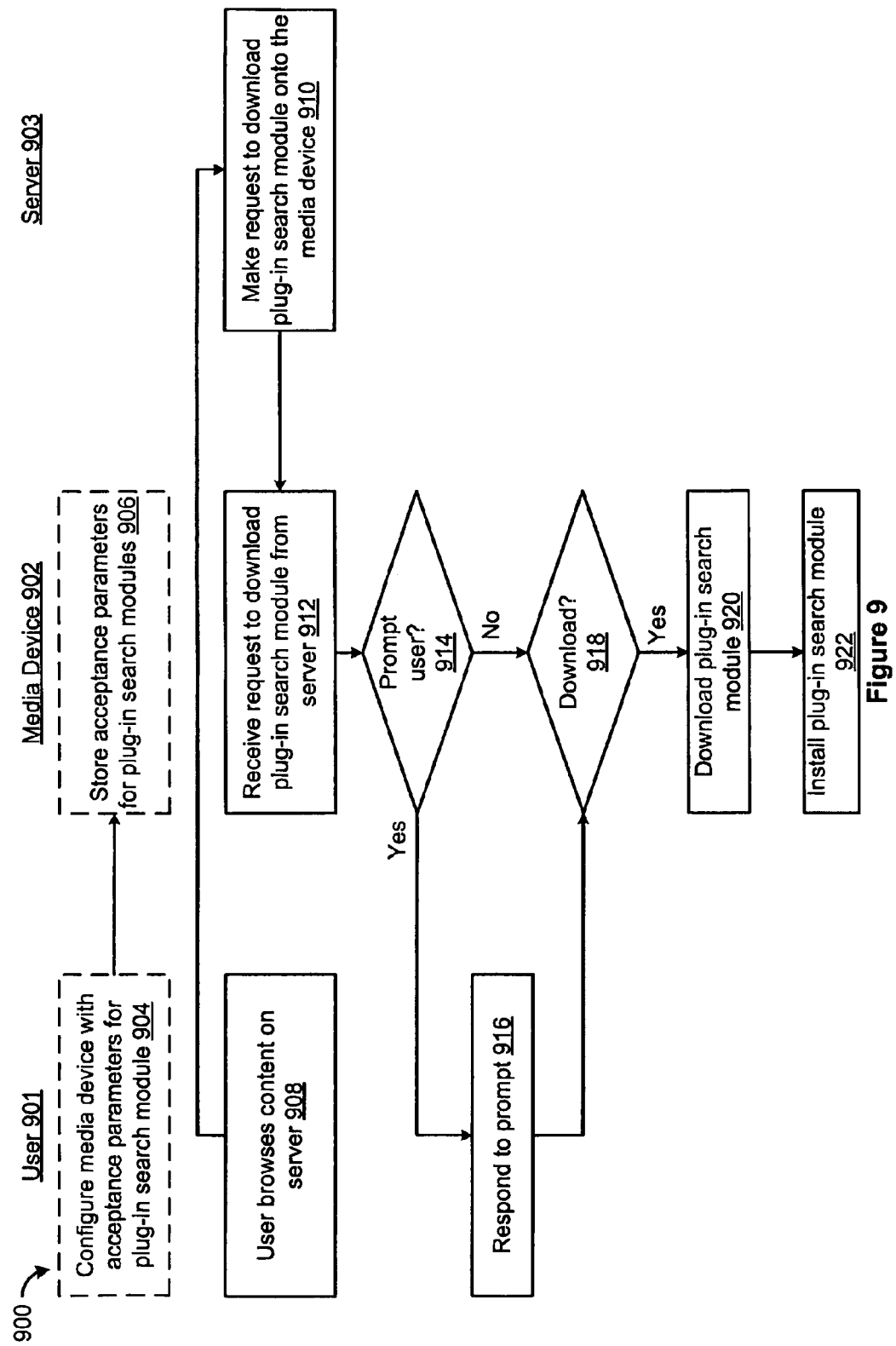

SYSTEM AND METHOD FOR PERFORMING CONTEXTUAL SEARCHES ACROSS CONTENT SOURCES

RELATED APPLICATIONS

This application is related to U.S. Pat. No. 7,243,307, issued on Jul. 10, 2007, which is incorporated by reference herein in its entirety.

TECHNICAL FIELD

The disclosed embodiments relate generally to performing contextual searches across multiple content sources to locate media files, and more particularly to perform contextual searches for media devices (e.g., set-top boxes, dedicated media players, etc.).

BACKGROUND

Dedicated media devices that can play content obtained from a network are becoming increasingly popular. When a desired media file is located by a user of the media device, the media file can be downloaded or streamed to the media device. For example, the user can use a search engine to locate the media file. However, using a search engine on a media device may be cumbersome. For example, on a portable media device, the portable media device may only include a few buttons or a touch-screen display. Although the portable media device may include an on-screen keyboard, selecting individual letters to form search queries can be cumbersome. Similarly, on a set-top box for a television, the only input device may be a remote controller, which also includes a limited set of buttons. Therefore, it is desirable to have an easy way to perform a media search on a device with limited input functionality.

Furthermore, a user of a media device may not know whether a given content source (e.g., a home network server, a portable media player, etc.) includes media file types (e.g., MP3 files, WMA files, etc.) for which the user is searching. Moreover, presently, multiple standalone applications, each with their own user interface, must be used to search for content. Thus, what is needed for media devices that are typically operated without the aid of fully functional input devices (e.g., keyboard, mouse, etc.) is a system that allows integrated searching of multiple sources using a single unified interface.

SUMMARY

Some embodiments provide a method, a system, and a computer readable storage medium for performing contextual searches across multiple content sources is provided. In these embodiments, a media device receives a request from a user to perform a contextual search based on a media file or metadata for the media file. The media device then determines a type of the media file. The media device presents a contextual search menu to the user. The contextual search menu can include one or more contextual search query types, where a contextual search query types can be based on the type of the media file. The media device receives from the user a selected contextual search query type selected from the one or more contextual search query types. The media device queries one or more search modules, each of which are associated with one or more content sources, to determine which one or more search modules can perform the selected contextual search query type. The media device generates a request for one or more search modules that can perform the selected contextual search query type to perform the selected contextual search query type against one or more selected content sources associated with the one or more search modules. The media device receives search results from the one or more search modules, where a search result can include links to one or more files associated with the one or more content sources. The media device then displays search results to the user.

In some embodiments, prior to requesting that the search module that can perform the selected contextual search query type perform the selected contextual search query type, the media device displays to the user one or more content sources associated with the one or more search modules that can perform the selected contextual search query type. The media device then receives the selected content source from the user selected from the one or more content sources associated with the one or more search modules that can perform the selected contextual search query type.

In some embodiments, the media device receives a selected search result from the user selected from the search results and obtains one or more media files associated with the selected search result. The media device then presents the one or more media files to the user.

In some embodiments, the media device receives a request from the user to download a plug-in search module. The media device then determines a location of the plug-in search module, downloads the plug-in search module from the location, and installs the downloaded plug-in search module.

In some embodiments, the media device receives a request from a server to download a plug-in search module. The media device then determines a location of the plug-in search module, downloads the plug-in search module from the location, and installs the downloaded plug-in search module. In some embodiments, the media device prompts the user with the option to install the plug-in search module prior to installing the downloaded plug-in search module.

In some embodiments, the media device determines the type of the media file from metadata for the media file. The metadata for the media file can be included with the media file and/or can be included in data separate from the media file.

In some embodiments, the media device queries all of the search modules on the media device and requests that all search modules that can perform the selected contextual search query type perform the selected contextual search query type.

In some embodiments, the media device transmits a search query to the selected content source. In these embodiments, the search query can be based on attributes and corresponding values of the media file and the selected contextual search query type.

In some embodiments, the one or more search modules are accessed through a common application programming interface (API).

To overcome the aforementioned problems, some embodiments provide a method, a system, and a computer readable storage medium for performing contextual searches across multiple content sources using a common application programming interface (API). These embodiments obviate the need for the media and/or content providers from having to create a new application for each media device, whose implementation may vary from device to device (e.g., which may include different user interfaces, programming languages, etc.). This API allows the content provider to present their data in conformance to the API, leaving the device manufacturers, or third party developers to perform the specific implementation for the device. Furthermore, these embodiments also allow users to perform media searches on devices with limited input functionality.

BRIEF DESCRIPTION OF THE DRAWINGS

FIG. 9 is a flow diagram of a process for installing a plug-in search module, according to some embodiments.

Like reference numerals refer to corresponding parts throughout the drawings.

DESCRIPTION OF EMBODIMENTS

Figure 1:
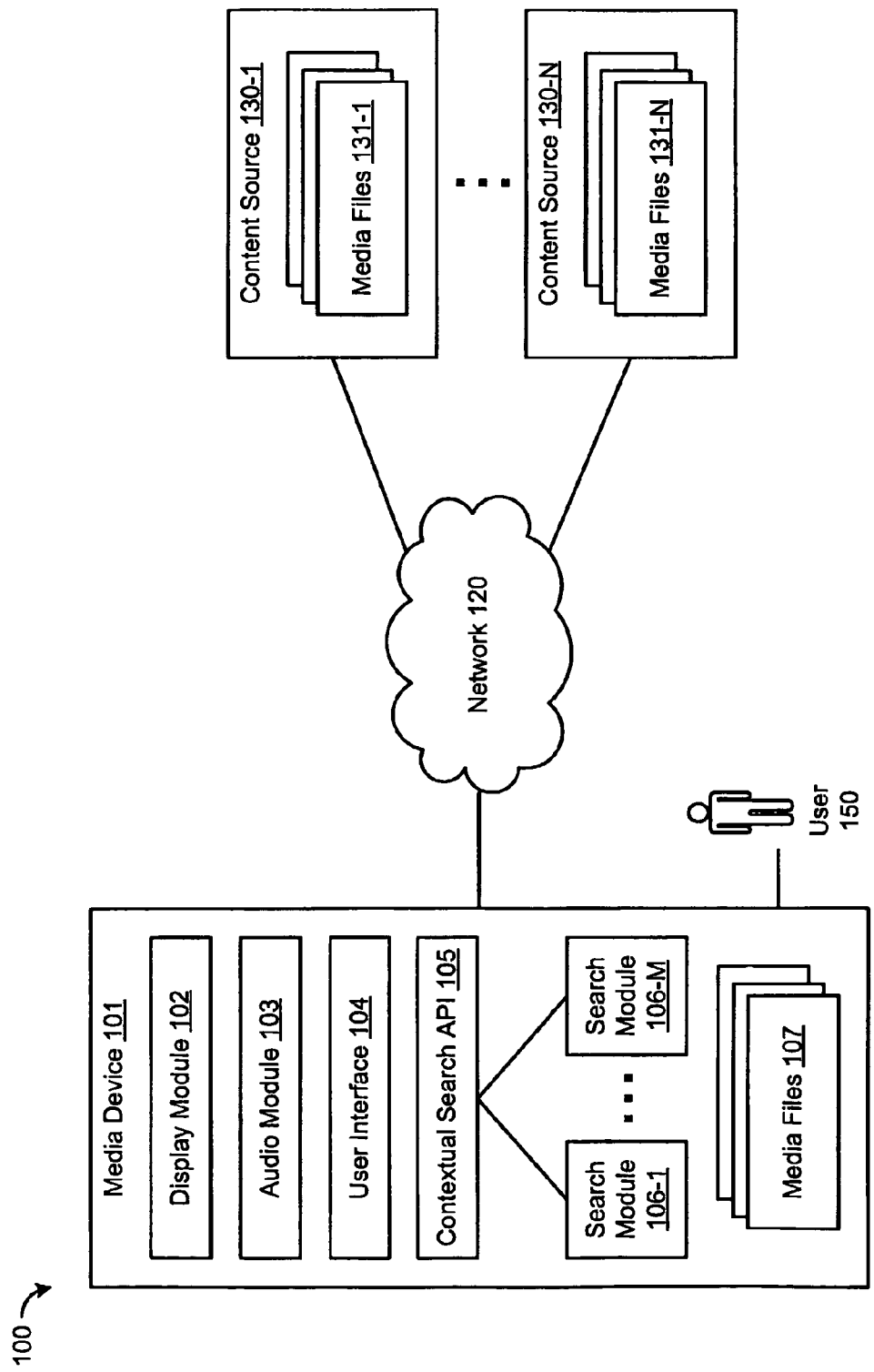
FIG. 1 is a block diagram illustrating an exemplary media device and a plurality of content servers, according to some embodiments.

Some embodiments provide a system, a method, and a computer readable storage medium to search for media files and/or content associated with media files. In these embodiments, a user of the media device does not need to use fully-functional input devices (e.g., keyboard, mouse, etc.). Instead, the user can use an input device with limited input functionality (e.g., buttons, etc.) to perform searches to locate media files and/or content associated with media files based on a given context. These searches are typically referred to as "contextual searches". For example, a contextual search can be performed based on a selected media file and/or a media file that is being viewed/played. Contextual searching allows a user to perform searches with little input (e.g., by using only a few buttons on a remote controller, etc.).

Media files can typically be accessed from a media device using several techniques, including: a tree hierarchy browser (e.g., a file system browser), or a parameterized query (e.g., for "paned browsers") where media are selected based on categories of metadata, and a search. Thus, some embodiments include a content browser that provides an abstraction layer between the media device and the implementation of a content search and/or selection module. The content browser can provide one or more of the following features: a single application programming interface (API) for browsing multiple content sources, supports tree and parameter browsing, and searching, allows for one-touch contextual searching, is extensible, allow new sources to be supported quickly, and can be tested and integrated in small sections. Some embodiments provide a user interface for parameterized searching and/or browsing of content (e.g., browsing and/or searching that is based on attribute and value pairs). The parameterized browsing and searching can be performed across multiple content sources, regardless of the media type (e.g., videos, music, images, etc.)

It should be appreciated that there may be cases where the browsing of media metadata is not best served by the above presentation techniques, an example might be a television electronic programming guide, where presentation might best be done via a conventional matrix layout. Such presentation would still benefit by using the consistent appearance of a contextual search menu.

In some embodiments, a contextual search application programming interface (API) is provided, which allows access to content from multiple content sources. The contextual search API provides a common API to perform contextual searching and/or selection of content from content sources (e.g., local and/or remote content sources). In some embodiments, a given interface is handled by a search and/or selection module. For example, if a module author is implementing a file system browser, the module author can choose to implement a tree content browser (e.g., a content browser that presents content in a tree structure), but not a parametric content browser (e.g., a content browser that presents content based on selected attribute and value pairs). Optionally, the module author can implement a search interface for a file system browser (e.g., a browser that presents the contents of a file system). In contrast, if a plug-in module author is implementing a plug-in module for a video content source (e.g., YOUTUBE), the plug-in module author can implement a parametric interface that can perform searches based on parameters (e.g., "timeframe=last month", "category=comedy", etc.), instead of a tree interface.

Note that for the sake of clarity, the discussion below refers to a "search module," which can refer to a search and/or selection module that can search for content and/or select content from a content source.

FIG. 1 is a block diagram 100 illustrating an exemplary media device 101 and a plurality of content servers 130, according to some embodiments. The media device 101 can include any device which can play or display media files. A media file can include one or more of an audio file, a video file, an image file, and/or a document. The media device 101 can include a music player, a video player, a set-top box. Note that a set-top box can include a device which augments the functionality of another device. For example, a set-top box for a television can allow the television set to receive programming through the Internet or to digitally record television shows. The content sources 130 can include any source of media files 131. For example, the content sources 130 can include a personal computer system, a server, a local data store, and a media download service. In some embodiments, the media device 101 is a portable media device. In some embodiments, the media device 101 is a standalone media device. In some embodiments, the media device 101 is a set-top box for another media device (e.g., a television set).

In some embodiments, the media device 101 is coupled to the content sources 130 through a network 120. The network 120 can generally include any type of wired or wireless communication channel capable of coupling together computing nodes. This includes, but is not limited to, a local area network, a wide area network, or a combination of networks. In some embodiments, the network 120 includes the Internet.

In some embodiments, the content sources 130 include the media files 131. In some embodiments, a given content source includes a single type of media files (e.g., only audio files). In some embodiments, a given content source includes multiple types of media files (e.g., audio files and video files).

In some embodiments, the media device 101 includes one or more of: a display module 102, an audio module 103, a user interface module 104, a contextual search application programming interface (API) 105, search modules 106, and media files 107. In some embodiments, these modules can include software modules and/or hardware modules. These modules can include instructions that can be stored in a computer readable medium and executed by a processor. For example, the processor can be the one or more CPUs 502 in FIG. 5 or specialized hardware such as application specific integrated circuits (ASICs) or field programmable gate arrays (FPGAs).

Figure 5:
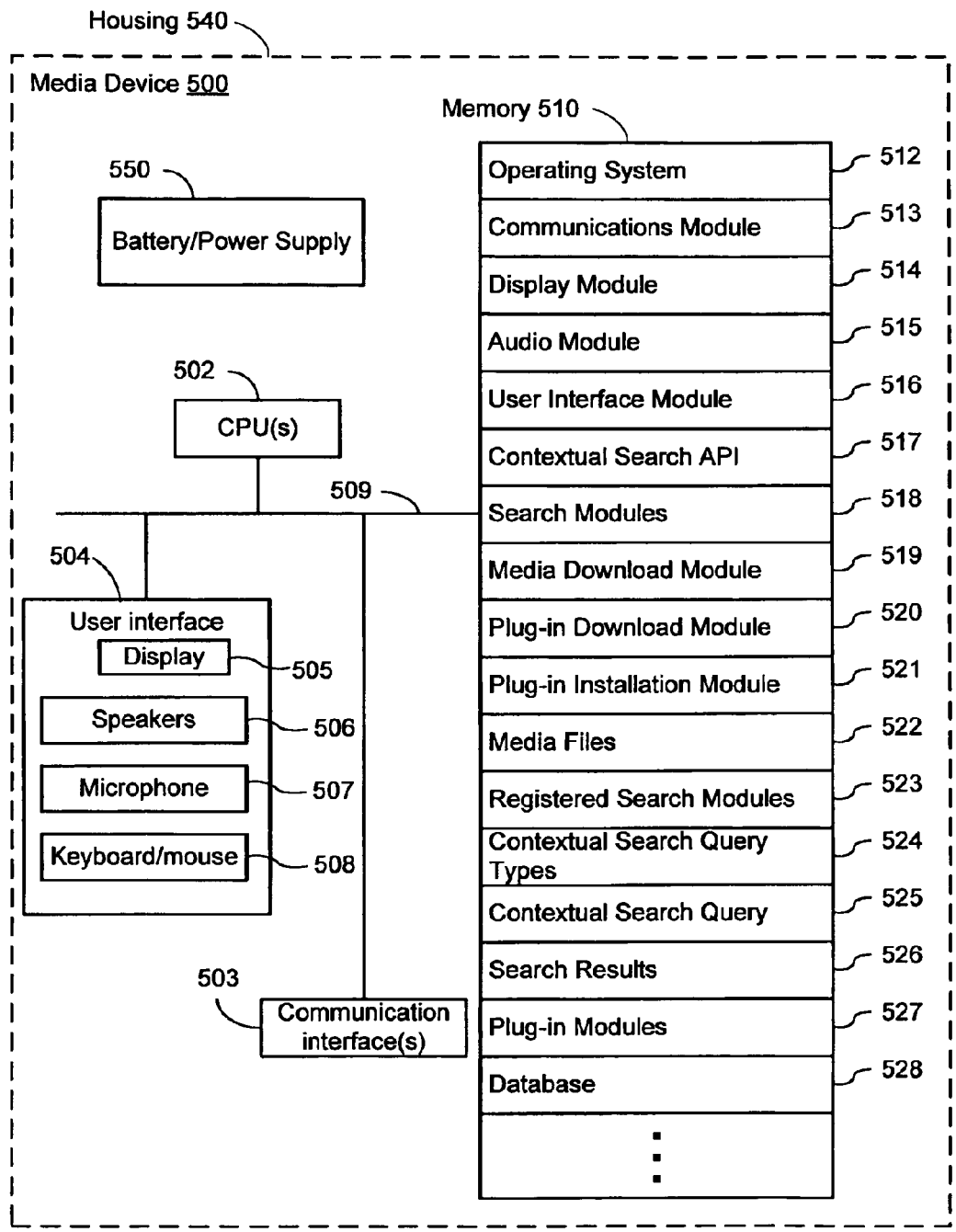
FIG. 5 is a block diagram illustrating a media device, according to some embodiments.

The display module 102 can generate video signals to drive a display for the media device 101 (e.g., the display 505 in FIG. 5). These video signals can be generated in response to playing one of the media files 107 (e.g., a video or an image file) and/or a user interface generated by the user interface module 104. The audio module 103 can generate signals to drive speakers (e.g., the speakers 506 in FIG. 5) and/or process signals received from a microphone (e.g., the microphone 507 in FIG. 5). These audio signals can be generated in response to playing one of the media files 107. The user interface module 104 can generate a user interface for the media device 101. For example, the user interface module 104 can generate windows, menus, buttons, lists, and other user interface elements. In some embodiments, the user interface module generates a user interface based on the system described in "Customizable Database-Driven Menu Structure for a Portable Computing Device" (U.S. Pat. No. 7,243,307, issued on Jul. 10, 2007), which is incorporated by reference herein in its entirety.

The media device 101 can be operated by a user 150 (through a user interface (e.g., the user interface 504 for the media device 500). For example, the user 150 can navigate through the media files 107 on the media device 101 to locate a media file. The user can then perform any number of actions. For example, the user can instruct the media device 101 to play the media file.

In some embodiments, the user can instruct the media device 101 to perform a contextual search based on a particular media file. For example, if the user 150 is playing a particular music track on the media device 101, the user 150 can instruct the media device to perform a contextual search based on attributes and/or parameters of the music track (e.g., locating more tracks by the same artist, locating more tracks on the same album, etc.). The contextual search can be performed regardless of whether the media device 101 is playing the media file. For example, the user 150 can use a file browser provided by the user interface module 104 to select a media file on which a contextual search is to be performed without playing the selected media file or not. Likewise, the user can browse data with no accompanying local data simply for the purpose of populating such a contextual search, and subsequent download or playback.

In some embodiments, the media device 101 performs a contextual search of the content sources 130 via the network 120. Since a given content source may include a different search interface than another content source, the media device 101 may need to perform a customized contextual search query for each of the content sources 130 to be searched. For example, a first content source may allow full text searching of its contents (e.g., "Madonna singer") while a second content source may only support specified attribute and value pair searches of its content (e.g., "Artist=Madonna"). Thus, some embodiments provide the contextual search API 105 as a common API layer for interfacing the search modules 106. The contextual search API 105 can provide a common programming interface to access the functions of the search modules 106, which in turn can search various content sources. For example, the contextual search API 105 can provide an API for generating search requests to the search modules 106 and receiving search results from the search modules 106.

In some embodiments, new search modules can be added (e.g., via a download) to the media device 101 and used without the need to reprogram the media device 101. For example, the download mechanisms described in "Customizable Database-Driven Menu Structure for a Portable Computing Device" (U.S. Pat. No. 7,243,307, issued on Jul. 10, 2007) can be used. Furthermore, any device that implements the contextual search API 105 can use the search modules 106 with little or no modification.

In some embodiments, the search modules 106 include search modules associated with one or more of the content sources 130. For example, a YOUTUBE search module can perform searches on YOUTUBE, an ITUNES search module can perform searches on ITUNES, etc. Each search module can manage the specific search interface for a respective content source. For example, a YOUTUBE search module may perform a parameterized search, whereas a GOOGLE Videos search module may perform a full text search. Furthermore, each search module can report to the contextual search API 105 the types of contextual searches that the search module supports. For example, a YOUTUBE search module may support contextual searches such as "Search for similar videos . . . ", "Search for more from this Artist . . . ", "Search for more from this Album", etc.

In some embodiments, a search module 106 can search for content (e.g., the media files 107) within the media device 101. For example, a local audio search module can perform a search for audio files on the media device 101. The discussion below regarding the search modules can be applied to embodiments where the content source is local or remote to the media device 101.

Note that the contextual search API 105 and the search modules 106 are described in more detail below.

Figure 2:
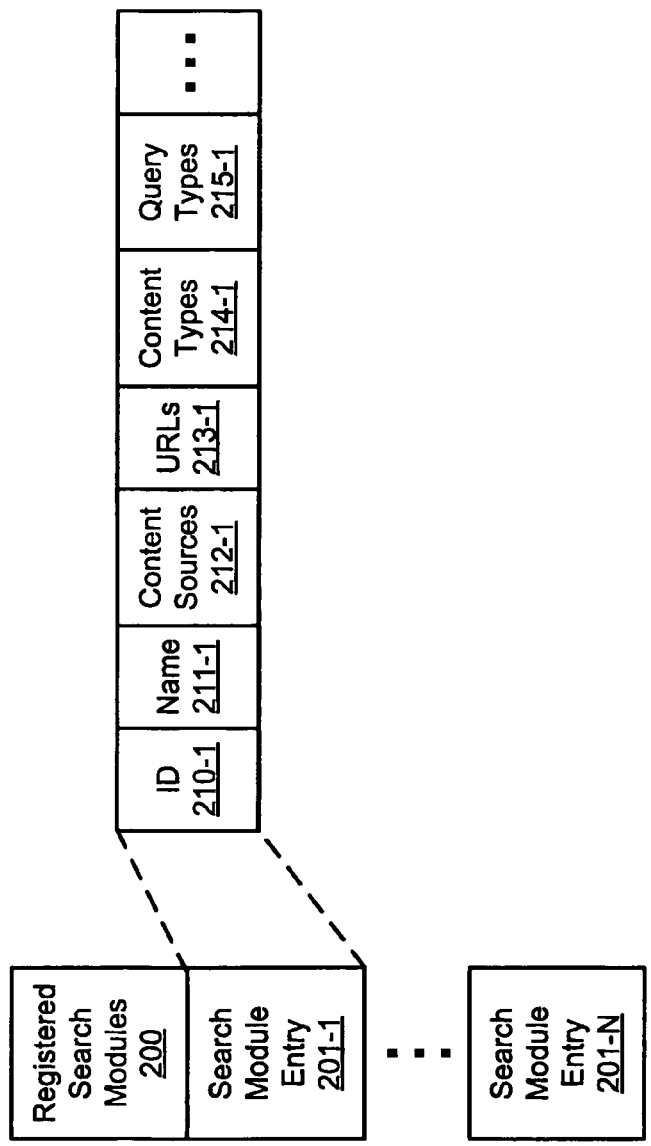
FIG. 2 is a block diagram illustrating a registered search modules data structure, according to some embodiments.

In some embodiments, each search module 106 on the media device 101 is registered on the media device. For example, the search modules 106 can be registered in a database or the like. When a user requests that a contextual search be performed, the media device 101 queries the database to determine which search modules are available on the media device. In some embodiments, a registered search modules data structure stores information associated with search modules that are available on the media device 101. FIG. 2 is a block diagram illustrating a registered search modules data structure 200, according to some embodiments. The registered search modules data structure 200 can include one or more search modules entries 201 associated with the search modules 106 for the media device 101. In some embodiments, a given search module entry (e.g., search module entry 201-1) includes one or more data fields. For example, the data fields can include, but are not limited to, an ID data field 210-1, a name data field 211-1, a content sources data field 212-1, a URLs data field 213-1, a content types data field 214-1, and a query types data fields 215-1. The ID data field 210-1 can include a unique identifier for the search module entry 201. The name data field 211-1 can include a name for the search module (e.g., the name data field for a YOUTUBE search module may include "YOUTUBE"). The content sources data field 212-1 can include names for the one or more of content sources on which the search module associated with the search module entry 201 can perform a search. The URLs data field 213-1 can include universal resource locators (URLs) for the one or more content sources on which the search module associated with the search module entry 201 can perform a search. Note that the content sources data field 212-1 and the URLs data field 213-1 can include multiple content sources and associated URLs. Thus, these fields can include specified delimited text (e.g., tab-delimited, comma delimited, etc.) that can be parsed to retrieve a list of content sources and associated URLs. Alternatively, these data fields can include a foreign key, pointer, or identifier to another data structure which includes a list of content sources and URLs. For example, if foreign keys for the content sources 212-1 and the URLs data field 213-1 are 1 and 5, respectively, a data structure for the content sources can include one or more entries associated with the foreign key 1 and a data structure for the URLs can include one or more entries associated with the foreign key 5.

In some embodiments, the media device 101 receives a request to perform a specified contextual search query from the user 150 to be performed on one or more specified content sources via a user interface for the media device 101 (e.g., the user interface 504 in FIG. 5). For example, the user 150 may request that the media device 101 perform a contextual search "Search for tracks by this Artist" on "ITUNES". The media device 101 then uses the contextual search API 105 to request that the search module associated with a specified content source (e.g., "ITUNES") perform the specified contextual search query (e.g., "Search for tracks by this Artist") on the specified content source.

Figure 3:
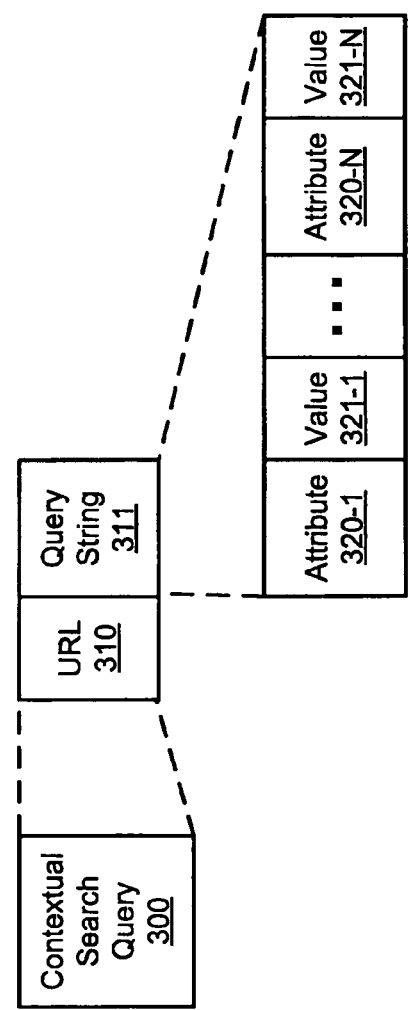
FIG. 3 is a block diagram illustrating a contextual search query data structure, according to some embodiments.

FIG. 3 is a block diagram illustrating a contextual search query data structure 300, according to some embodiments. In some embodiments, the contextual search query data structure 300 is generated by a search module and transmitted to one or more content sources. The contextual search query data structure 300 can include a URL 310 and a query string 311. The URL 310 can be the URL of the content source for which the contextual search query is directed. The query string 311 can include one or more attribute 320 and value 321 pairs. For example, the attributes can include one or more of: an artist name, an album name, a song name, an author name, a file name, a location, a category, a publication date, and one or more metadata tags. In some embodiments, the attribute is "text" and the value is a text query string (e.g., "Madonna Walk Like an Egyptian"). In these embodiments, the "text" attribute can be used in a search module for a content source that can perform text searches.

In some embodiments, a search module transmits a contextual search query (e.g., as the contextual search query data structure 300) to a content source. In these embodiments, the content source performs the contextual search query and returns one or more search results to the search module. For example, a respective search result returned to the search module can include one or more of: a title for a respective media file, a universal resource locator (URL) to the respective media file, a content type of the respective media file, an artist associated with the respective media file, an album associated with the respective media file, a category of the respective media file, a file name of the respective media file, a file size of the respective media file, a bit rate of the respective media file, and a length of the respective media file. In some embodiments, the search results are returned in a structured format (e.g., XML, as attribute-value pairs, etc.). In some embodiments, the search results are returned in an unstructured format and the search module parses and extracts the search results from the unstructured format. For example, the search module can perform a screen scrape, which extracts specified attributes and values from unstructured documents.

Figure 4:
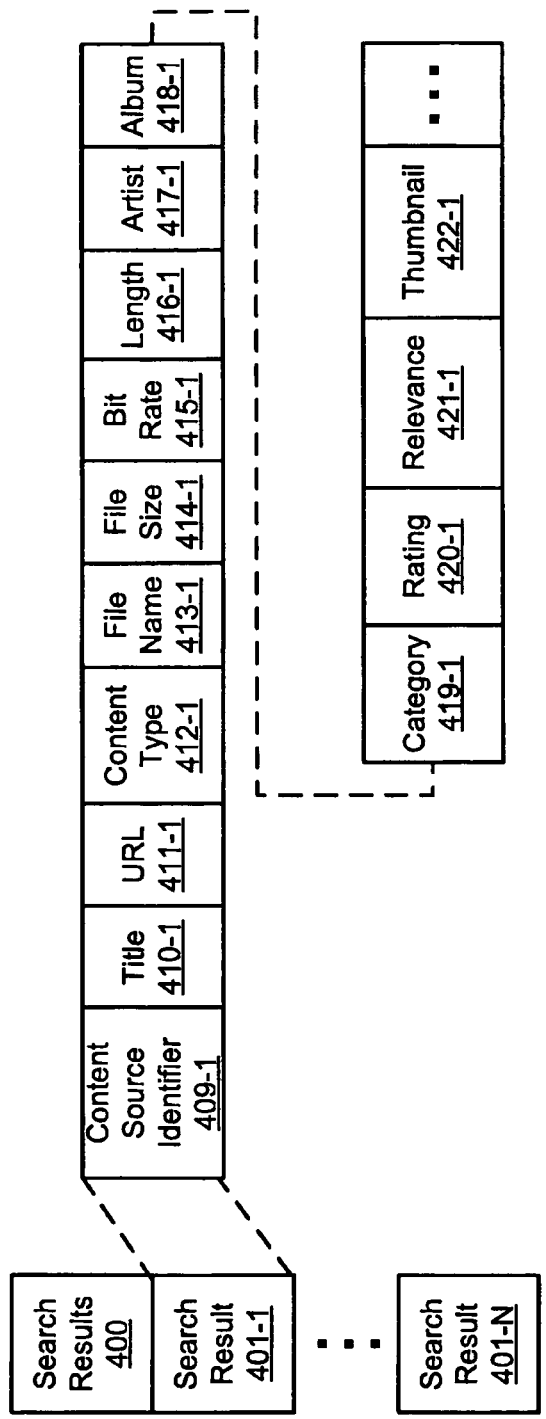
FIG. 4 is a block diagram illustrating a search results data structure, according to some embodiments.

In some embodiments, after receiving search results from the one or more content sources, the search module generates a search results data structure which is returned to the contextual search API. FIG. 4 is a block diagram illustrating a search results data structure 400 that is returned from a search module to the contextual search API 105, according to some embodiments. The search results data structure 400 include one or more search results 401, each of which can be associated with a media file located on the content source or another server. A search result 401-1 can include, but is not limited to, one or more of: a content source identifier 409-1; a title 410-1, a URL 411-1, a content type 412-1, a file name 413-1, a file size 414-1, a bit rate 415-1, a length 416-1, an artist 417-1, an album 418-1, a category 419-1, a rating 420-1, a relevance 421-1, and a thumbnail 422-1. The content identifier 409-1 can include an identification of the content source on which a respective media file was found. The title 410-1 can include a title a media file located on the content source. The URL 411-1 can include the URL to the media file located on the content source. The content type 412-1 can include the type of media file (e.g., a Multipurpose Internet Mail Extensions content type). The file name 413-1 can include a file name for the media file. The file size 414-1 can include the file size of the media file. The bit rate 415-1 can include the bit rate of the media file. The length 416-1 can include the play time of the media file. The artist 417-1 can include a name of the artist for the media file. The album 418-1 can include a name of the album associated with the media file. The category 419-1 can include a category for the media file (e.g., contemporary R&B, horror movie, action movie, etc.). The rating 420-1 can include the aggregated score or "number of stars" a search result has received represented in a normalized format (e.g., a floating-point number with a predefined range), which facilitates comparison across content sources. The relevance 421-1 can include a normalized representation (e.g., a floating-point number with a predefined range) of the information regarding the confidence of a content source that a search result is an appropriate result for the search performed, or can infer such confidence from the ordering of returned search results. The thumbnail 422-1 can be a URL or an embedded representation of an image associated with a search result (e.g., an album cover, a frame from a video, etc.). Note that other data fields can be included in the search result 401.

The contextual search API 105 then passes the search results (e.g., the search results data structure 400) to the media device 101. In some embodiments, the user interface module 104 on the media device 101 displays one or more of the search attributes of the search results.

FIG. 5 is a block diagram illustrating a media device 500, according to some embodiments. The media device 500 can be the media device 101 illustrated in FIG. 1, a standalone media device (e.g., music player), digital video recorder, a cell phone, etc. In some embodiments, the media device is a portable media device. The media device 500 typically includes one or more processing units (CPU's) 502, one or more network or other communications interfaces 503, memory 510, and one or more communication buses 509 for interconnecting these components. The media device 500 optionally may include a user interface 504 comprising one or more of a display device 505, speakers 506, microphone 507, and a keyboard and/or pointing device (e.g. mouse) 508. The memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 510 may optionally include one or more storage devices remotely located from the CPU(s) 502. The memory 510, or alternately the non-volatile memory device(s) within the memory 510, includes a computer readable storage medium.

In some embodiments, the memory 510 stores the following programs, modules and data structures, or a subset thereof: an operating system 512, a communications module 513, a display module 514, an audio module 515, a user interface module 516, a contextual search API 517, search modules 518, a media download module 519, a plug-in download module 520, a plug-in installation module 521, media files 522, a registered search modules data structure 523, contextual search query types 524, contextual search query data structures 525, a search results data structure 526, plug-in modules 527, and databases 528.

The operating system 512 can include procedures for handling various basic system services and for performing hardware dependent tasks. The communication module 513 can be used for connecting the media device 500 to other computers via the one or more communication network interfaces 503 (wired or wireless) and one or more communication networks (e.g., the network 120 in FIG. 1), such as the Internet, other wide area networks, local area networks, metropolitan area networks, and so on. The display module 514 can be the display module 102 in FIG. 1 and can generate video signals to drive the display 505. The audio module 515 can be the audio module 103 in FIG. 1 and can generate signals to drive the speakers 506 and/or process signals received from the microphone 507. The user interface module 516 can be the user interface module 104 and can generate a user interface for the media device 101. The contextual search API 517 can be the contextual search API 105 in FIG. 1 and can provide a common API layer for interfacing with and accessing functions of search modules 518. The search modules 518 can be the search modules 106 in FIG. 1 and can include search modules associated with one or more content sources (e.g., local and/or remote content sources). In some embodiments, the search modules 518 are plug-in search modules which can be downloaded and installed on the media device 500. The media download module 519 can download media files from content sources. The plug-in download module 520 and the plug-in installation module 521 can download and can install plug-in modules, respectively. For example, the plug-in modules can include plug-in search modules that can interface with the contextual search API 517. The media files 522 can be the media files 107 in FIG. 1. The registered search modules data structure 523 can correspond to the registered search modules data structure 200 in FIG. 2.

The contextual search query types 524 can include one or more contextual search queries supported by the media device 500. For example, the contextual search query types 524 can include a "Search for tracks from this artist", "Search for tracks from this album," "Search for videos for this track," "Search for videos for this artist," "Search for videos for this album," etc. The contextual search query data structures 525 can be the contextual search query data structures 300 in FIG. 3. The search results data structure 526 can be the search results data structure 400 in FIG. 4. The plug-in modules 527 can include modules that can be downloaded and installed into the memory 510. For example, the plug-in modules 527 can include plug-in search modules for performing contextual search queries. The databases 528 include databases that can be used to store one or more of user interface menu data, etc., as described in U.S. Pat. No. 7,243,307.

In some embodiments, the media device 500 is included within a housing 540. The housing 540 can provide mechanical support and protection for the components in the media device 500. The media device 550 can also include a battery and/or power supply 550. The battery and/or power supply 550 can provide power to the components within the media device 500 during operation.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 510 may store a subset of the modules and data structures identified above. Furthermore, the memory 510 may store additional modules and data structures not described above.

Figure 6:
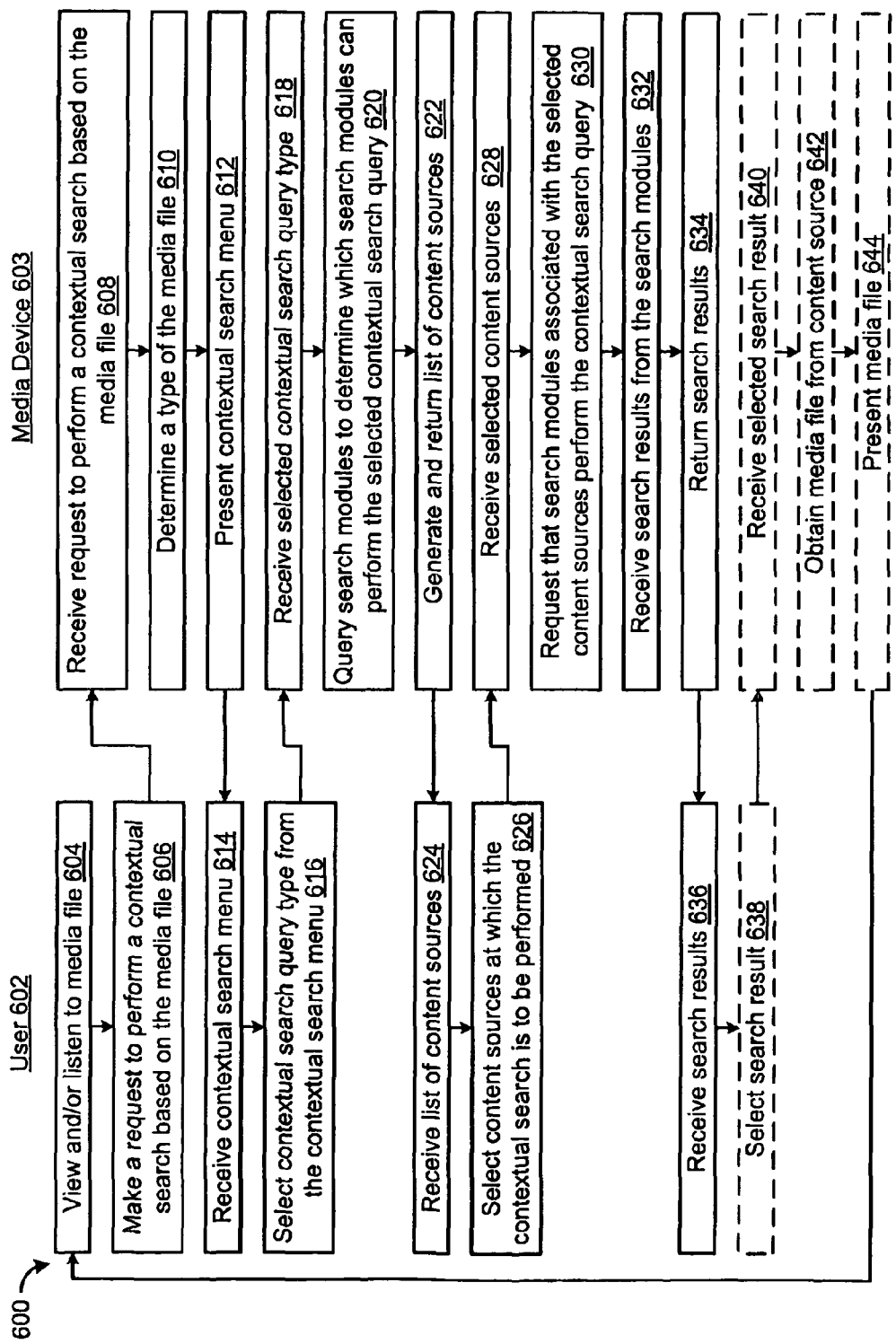
FIG. 6 is a flow diagram of a process for performing contextual searches to locate content associated with a media file, according to some embodiments.

FIG. 6 is a flow diagram of a process 600 for performing contextual searches to locate content associated with a media file, according to some embodiments. The process 600 may be governed by instructions that are stored in a computer readable storage medium and that are executed by one or more processors of one or more servers. Each of the operations shown in FIG. 6 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

In the process 600, a user 602 (e.g., the user 150 in FIG. 1), uses a media device 603 (e.g., the media device 101 in FIG. 1). In some embodiments, the media device 603 includes one or more search modules that can perform contextual searches against content sources on behalf of the media device 603. The user 602 views and/or listens a media file on the media device 603 (604). While viewing and/or listening to the media file, the user 602 makes a request to the media device 603 to perform a contextual search based on the media file (606). For example, this request can be made by selecting a button or menu item on a user interface for the media device 603. In some embodiments, the user 602 makes a request to the media device 603 to perform a contextual search based on the media file when the user 602 is not viewing or listening to the media file. For example, the user can browse a file system or a listing of media files on the media device 603, highlight a desired media file, and make a request to the media device 603 to perform a contextual search based on the media file without viewing or listening to the media file. In some embodiments, the request to perform the contextual search based on the media file is received at a set top box. In some embodiments, the set-top box is a set-top box for a television set.

Figure 8B:
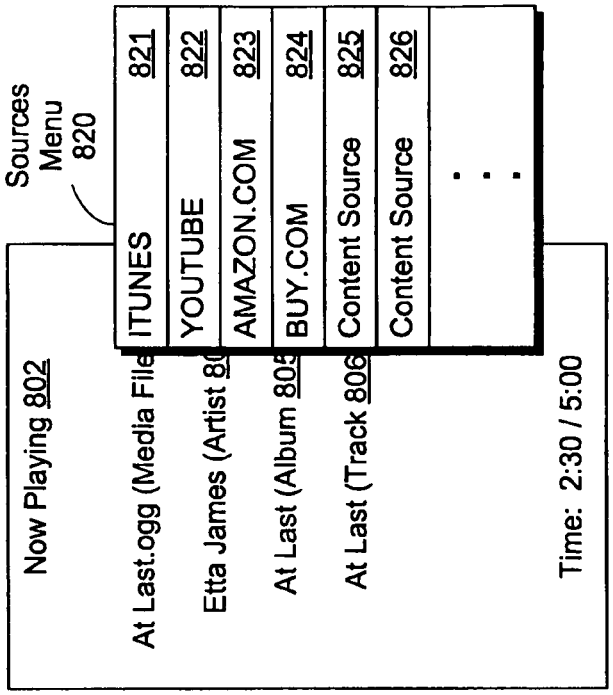
FIG. 8B illustrates an exemplary content source menu for the exemplary media device, according to some embodiments.
Figure 8A:
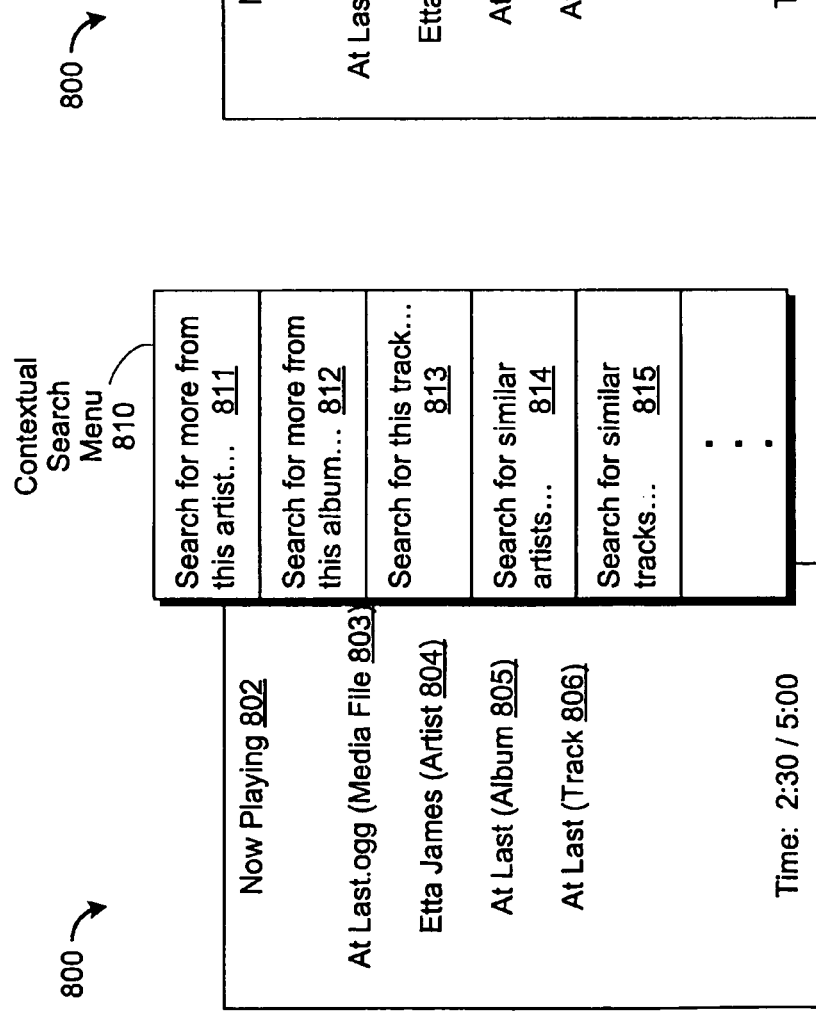
FIG. 8A illustrates an exemplary contextual search menu for an exemplary media device, according to some embodiments.

The media device 603 receives a request from a user to perform a contextual search based on a media file (608). In response to the request, the media device 603 determines a type of the media file (610). In some embodiments, while determining the type of the media file, the media device 603 determines the type of the media file from metadata for the media file. For example, the metadata for the media file can be included with the media file. Alternatively, the metadata for the media file can be included in data that is separate from the media file (e.g., a programming guide, a catalog, etc.). In some embodiments, the metadata includes attributes and/or values for the media file. For example, the attributes can include, but are not limited to, an artist name, an album name, a track name, a category, etc. The media device 603 then presents a contextual search menu to the user (612). In some embodiments, the contextual search menu includes one or more contextual search query types, which are based on the type of the media file. FIG. 8A illustrates an exemplary contextual search menu 810 in a user interface 800 for an exemplary media device, according to some embodiments. The media device can be any one of the media devices 101 and 500 in FIGS. 1 and 5, respectively. The user interface 800 can include a "Now Playing" screen 802, which can include, but is not limited to, one or more of the name of a media file 803 (e.g., "At Last.ogg") currently being accessed by a user (e.g., playing, stopped, paused, etc.), an name of an artist 804 (e.g., "Etta James") associated with the media file 803, a name of an album 805 (e.g., "At Last") associated with the media file 803, a name of a track 806 (e.g., "At Last") associated with the media file, and a time counter for the media file. The contextual search menu 810 can include a number of contextual search query types. For example, the contextual search query types can include a "Search for more from this artist" 811, which can search for media files associated with the artist 804, a "Search for more from this album" 812, which can search for media files associated with the album 805, a "Search for this track" 813, which can search for media files associated with the track 806 (e.g., variations on the track, mixes, other covers by other artists, etc.), a "Search for similar artists" 814, which can search for media files associated with artists that are similar to the artist 804, and a "Search for similar tracks" 815, which can search for media files associated with tracks that are similar to the track 806. In some embodiments, the user 602 can select one or more contextual search query types 811-815.

Returning to FIG. 6, the user 602 receives the contextual search menu (614) and selects a contextual search query type from the contextual search menu (614).

The media device 603 receives from the user a selected contextual search query type selected from the one or more contextual search query types (618) and queries one or more search modules each associated with one or more content sources to determine which one or more search modules can perform the selected contextual search query type (620). The media device 603 then generates and returns a list of content sources to the user 602 (622). In some embodiments, a single content source is associated with a single search module. In some embodiments, returning the list of content sources to the user 602 includes displaying to the user one or more content sources associated with the one or more search modules that can perform the selected contextual search query type. FIG. 8B illustrates an exemplary content source menu 820 in the user interface 800 for the exemplary media device, according to some embodiments. The content sources menu 802 includes content sources 821-826, which the user 602 can select using the user interface for the media device. In some embodiments, the user 602 can select one or more content sources 821-826 to perform the contextual search query type.

Returning to FIG. 6, the user 602 receives the list of content sources from the media device 603 (624) and selects one or more content source where the contextual search is to be performed (626).

The media device 603 then receives the one or more selected content sources from the user 602 selected from the one or more content sources associated with the one or more search modules that can perform the selected contextual search query type (628). Next, the media device 603 requests that one or more search modules that can perform the selected contextual search query type perform the selected contextual search query type against the one or more selected content sources associated with each search module (630). In some embodiments, while performing the selected contextual search query type against the selected content source associated with the one or more search modules, each respective search module transmits a search query to the content sources associated with the respective search module, wherein the search query is based on attributes and corresponding values of the media file and the selected contextual search query type. For example, a search module may transmit a contextual search query as described above with reference to FIG. 3. The media device 603 then receives search results from the one or more search modules (632). In some embodiments, the search results include links to one or more files associated with the one or more selected content sources. For example, the files can include one or more of: an audio file, a video file, an image file, and/or a document. In some embodiments, after receiving the search results from the content sources, the search modules generate a search results data structure (e.g., the search results data structure 400) that is passed to the contextual search API for the media device 603. The media device 603 then returns the search results to the user 602 (634). In some embodiments, returning the search results to the user 602 includes displaying the search results to the user 602.

In some embodiments, instead of performing operations 620-630, after receiving the selected contextual search query type, the media device queries all of the search modules on the media device 603 and requests that search modules that can perform the selected contextual search query type perform the selected contextual search query type. Thus, at operation 632, the media device 603 receives search results from all of the search modules that can perform the selected contextual search query type. In these embodiments, the user does not need to select a content source before receiving all search results. Instead, in these embodiments, the media device 603 can present the search results sorted and/or grouped by the content source(s) from which the search results were received.

Figures 8C, 8D:
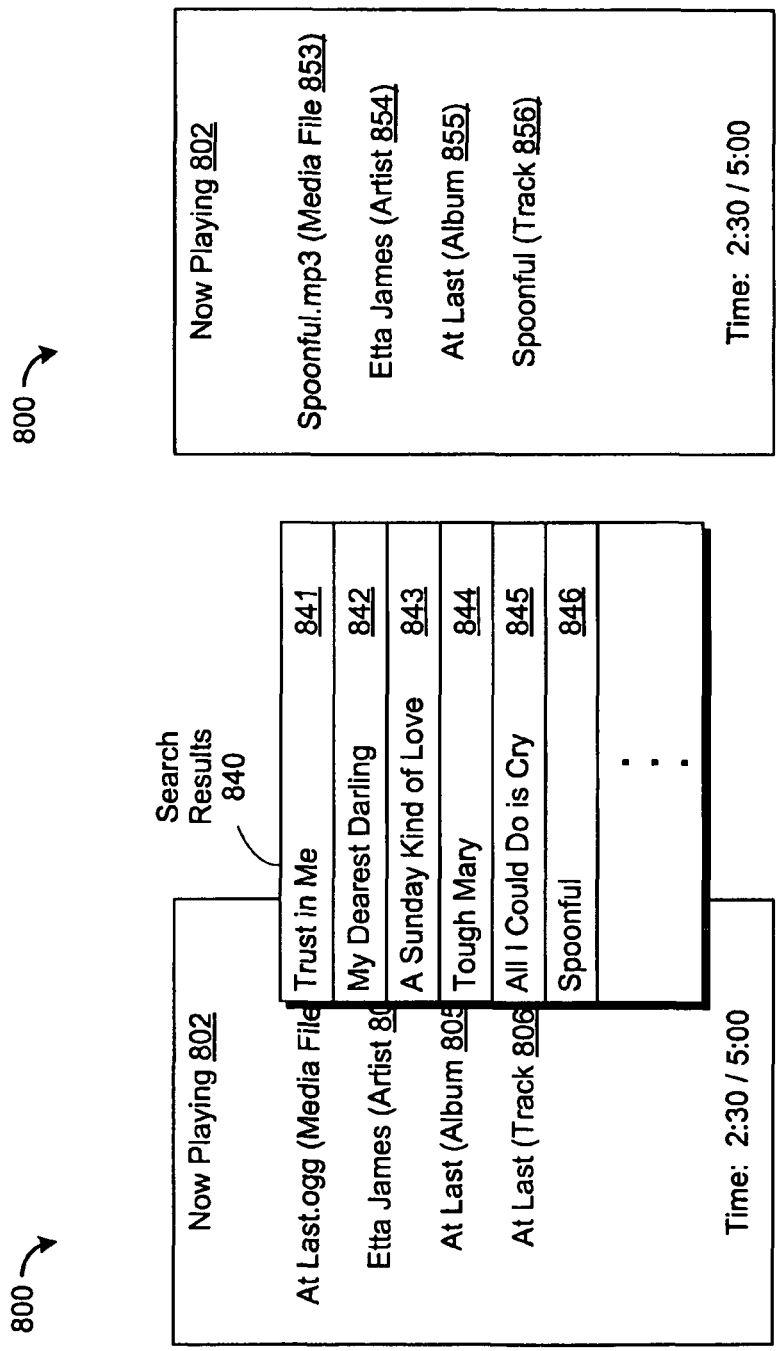
FIG. 8C illustrates an exemplary search result menu for the exemplary media device, according to some embodiments.
FIG. 8D illustrates an exemplary user interface of the media device, according to some embodiments.

The user 602 receives the search results (636). FIG. 8C illustrates an exemplary search result menu 840 in the user interface 800 for the exemplary media device, according to some embodiments. The search results menu 840 includes search results 841, which can be selected by the user 602. In some embodiments, the user 602 can select one or more of the search results 841. The exemplary search results 841 are produced based on the contextual search query type "Search for more from this album . . . " 811.

Returning to FIG. 6, the user 602 can optionally select a search result (638). If the selected search result must be purchased before it can be downloaded, the media device 603 can prompt the user for payment information (e.g., a credit card number, a bank account number, etc.) and/or a username and password for an account associated with the content source for the search result.

The media device 603 optionally: receives a selected search result from the user selected from the search results (640), obtains one or more media files associated with the selected search result (642), and presents the one or more media files to the user (644) (e.g., the media device 603 plays and/or displays the media file for the user). In some embodiments, the media file is obtained by a search module that generated the search results.

The user 602 can then optionally view the presented media file on the media device 603. FIG. 8D illustrates an exemplary user interface of the media device after the user 602 has selected a search result from the search results 840, according to some embodiments. As illustrated in FIG. 8D, the "Now Playing" screen 802 indicates that a media file 853 (e.g., "Spoonful.mp3"), associated with an artist 854 (e.g., "Etta James"), an album 855 (e.g., "At Last"), and a track 856 (e.g., Spoonful), is being played on the media device.

In some embodiments, only a subset of the operations in FIG. 6 is performed. For example, the user 602 may only want to view the available content sources for a given media file. Thus, only operations 604-624 are performed.

In some embodiments, software running on the device may use stored data to automate some or all of the operations 606, 614-616, 624-626 and 636-638, which require user input. Examples of this stored data can include user preferences obtained before the invocation of the contextual search API (e.g. which content sources to search by default) and selection criteria created by the designer of the software which invokes the API (e.g. a minimum threshold value for the "rating" attribute of a search result). Automating operations 606, 614-616, and/or 624-626 enables software to display search results that may be related to content currently being viewed and/or listened to during playback or immediately after playback finishes. Automating all steps requiring user interaction allows software using the contextual search API to play media continuously, creating a passive viewing experience, which is not limited to one content source.

Figure 7:
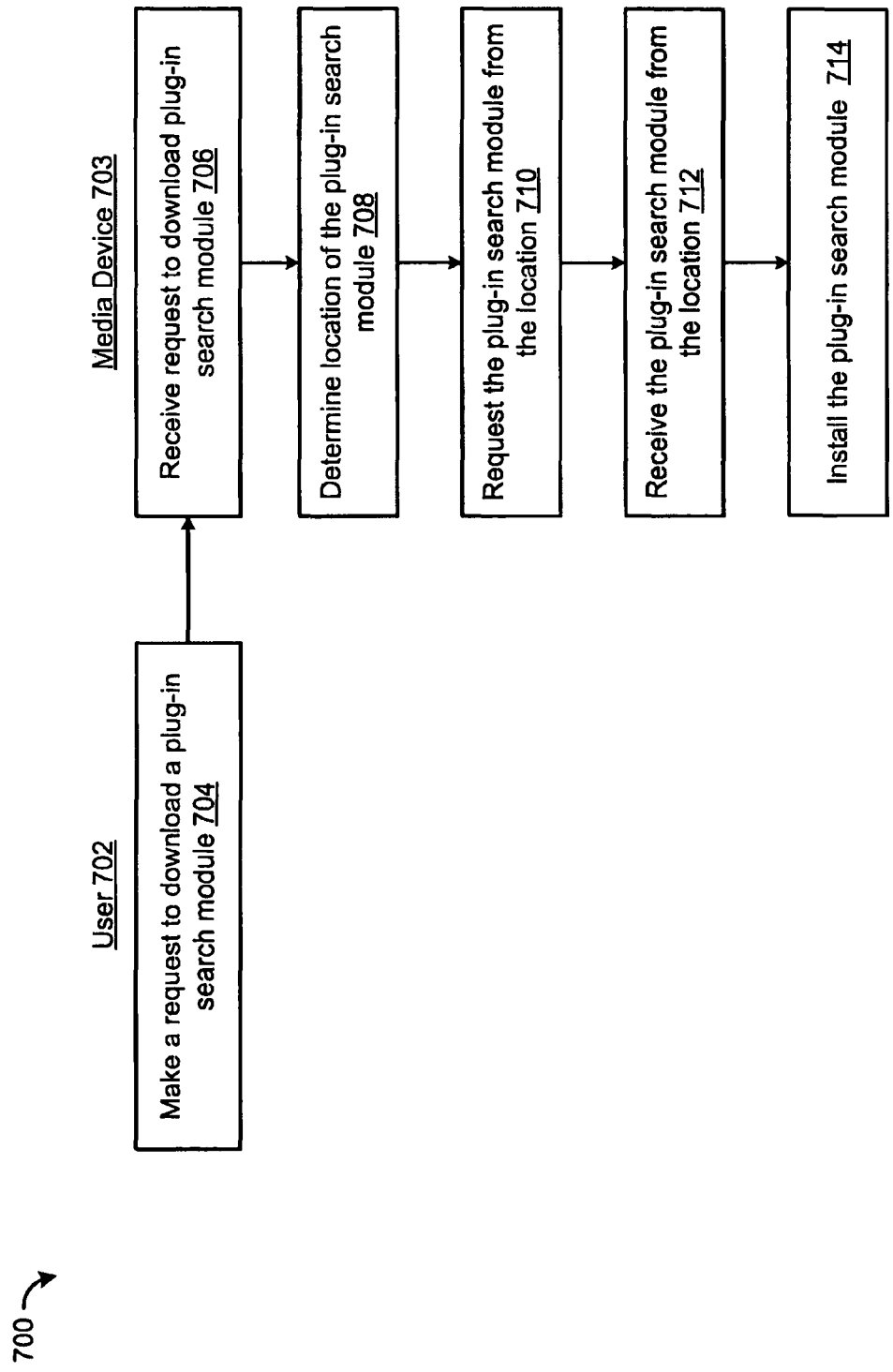
FIG. 7 is a flow diagram of a process for installing a plug-in search module, according to some embodiments.

In some embodiments, plug-in modules (e.g., plug-in search modules) can be downloaded and installed onto the media device. FIG. 7 is a flow diagram of a process for installing a plug-in search module, according to some embodiments. The process 700 may be governed by instructions that are stored in a computer readable storage medium and that are executed by one or more processors of one or more servers. Each of the operations shown in FIG. 7 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

In the process 700, a user 702 (e.g., the user 150 in FIG. 1), uses a media device 703 (e.g., the media device 101 in FIG. 1). The user 702 makes a request to the media device 703 to download a plug-in search module (704). The media device 703 receives the request from the user 702 to download a plug-in search module (706) and determines a location of the plug-in search module (708). For example, the media device 703 can perform a search in a plug-ins database to obtain a location of the requested plug-in search module. The plug-ins database can be a database that is stored on the media device 703 or on a remote device (e.g., a server). Alternatively, the media device 703 can perform a search in a search engine accessible via the network 120. The media device 703 then requests the plug-in search module from the location (710) and receives the plug-in search module from the location (712) and installs the downloaded plug-in search module in the memory of the media device 703 (714).

In some embodiments, the contextual search API provides a generic text matching search, which can be interpreted by the search and/or selection modules in a specified manner. For example, a video search module (e.g., YOUTUBE plug-in) may perform a parametric search. Accordingly, the video search module interprets the generic text matching search request as a parametric search. In contrast, a file system browser may perform a case-insensitive, space-tokenized search. Accordingly, the file system browser interprets the generic text matching search request as a case-insensitive, space-tokenized search. In some embodiments, the search modules support alternative parameters. For example, a music content source may accept an "Artist" search. Similarly, a video content source may also accept an "Artist" search (e.g., searching for a music video, etc.).

In some embodiments, a search module provides a callback function to inform an application (via the contextual search API) of the parameters that the search module supports (e.g., parameters for parameterized selection and for searching). For example, some media devices (e.g., an Apple iPod) support both music and video. Thus, this media device may include at least two search modules (or at least two sets of search parameters) for the searching and/or selecting content local to the media device. For example, the search modules can include a local video search module and a local audio search module. If a user wants to listen to music, the user can use the media device to in a music player mode. Accordingly, the local audio search module is loaded. A music selection window appears. The user can then choose to select music files by parameter. For example, the user can browse to the "Artist" tab. The user can then select an artist, an album, and then a track. To fulfill the user's request, the media device can request values for the parameter "Artist" for the selected track. All of the local content search modules on the media device that support the "Artist" parameter can respond with a list of possible values from which to choose. In some embodiments, these search modules do not search for video files because the audio search module knows that videos shouldn't be selected by "Artist". When the user selects an artist and views the albums, the audio search module is queried again, but with a restriction on the Artist. Each search module in the media device responds with a list of content, which the user can select.

In some embodiments, the user can select an artist and request that the media device perform a contextual search based on the media file. For example, the contextual search can be "Search for this artist . . . " The media device can present a list of content sources which can perform the contextual search query (e.g., "Search for this artist . . . ", etc.). The user can select a content source (e.g., YOUTUBE) and play a music video for the artist. In some embodiments, after the media device finishes playing the music video, the user can view a "Playback History" dialog box from the video search module to return back to the original media file. Note that the search history can be separate from the contextual search API. When a search is performed, and an application wants to save the search to history, the application can push the search on a history stack. The search history can include an application ID for the application, a string telling that application how to repeat the search, and a string for displaying the search to humans.

When the user chooses a contextual search query (e.g., "Search for this artist . . . ", etc.), the contextual search API identifies the search modules that accept "Artist" as a search parameter. A video search module can specify that the video search module accepts "Artist" as a valid parameter. This does not have to be one of the parameters accepted by the content source which the search module queries; while the parameters available for browsing content without searching can be determined by the underlying content source, the author of a search module may choose to include any parameter for searching a content source. For example, the author of a search module for a video content source may choose to accept "Artist" as a search parameter, even though "Artist" is not explicitly provided by the content source as a parameter for filtering search results, if the author of the search module knows that a full-text search for a particular artist on this content source is likely to return content related to the artist being searched.

In some embodiments, the contextual search API includes the following data structure: a content type (integer), a content UID (string), and a content URI (string). This data structure can be sent to a search module when a contextual search is requested. The content UID can be used as an argument to a method to obtain metadata about a particular content item. For example, music files can include metadata information such as Artist, Album, Track, etc. Video files can include metadata information such as a link to the clip thumbnail, ratings, related videos, etc. Thus, search module authors can identify the parameters required for browsing and the metadata entries supported by the content source and/or media files. The content URI is passed to the search module.

FIG. 9 is a flow diagram of a process for installing a plug-in search module, according to some embodiments. The process 900 may be governed by instructions that are stored in a computer readable storage medium and that are executed by one or more processors of one or more servers. Each of the operations shown in FIG. 9 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

The process 900 is an alternative embodiment of the process 700 illustrated in FIG. 7 for obtaining a plug-in search module. In the process 900, the request to install the plug-in search module comes from a remote server (e.g., a server hosted by a media content provider, etc.). The process 900 may be invoked when a user 901 browses content hosted on the server (e.g., a web page or media files hosted on a server for a content provider, etc.), the user can be prompted to add the search module. For example, the prompt can be "Include this catalog in future searches?" In some embodiments, the "server" can be a peer node (e.g., a client or a server) or user, which provides a list of available media or metadata such as "favorites." For example, consider a movie download or streaming site that includes multiple users. This site may include an option such as "Include this user's 'favorites' in future searches," which can be presented upon browsing that user's collection. Similarly, consider a peer node, such as local computer, that connects to the media device 902. The prompt in this case can be "Include your PC collection in future searches." Note that this type of a connection can be initiated by the media device 902 or the connecting computer.

Initially, the user 901 can optionally configure the media device 903 with acceptance parameters for downloading and installing a plug-in search module (904). For example, the acceptance parameters can include one or more of: an "accept all" parameter, a "reject all" parameter, and/or a "prompt" parameter. The media device 902 then optionally stores the acceptance parameters for the plug-in search modules (906).

The process 900 continues when the user 901 browses content on the server 903 (908). In some embodiments, the user 901 can use the media device 902 to browse content on the server 903. In some embodiments, the user 901 can use a computer system (e.g., a laptop, etc.) to browse content on the server 903. In these embodiments, the user 901 can browse the content on the server 903 using an account associated with the media device 902. For example, the user 901 can be logged into an account for a video download site, where the account for the user 901 is linked or associated with the media device 902.

The server 903 may have a plug-in search module which can allow the media device 902 to search for and/or download content from the server 903. Thus, in some embodiments, the server 903 then makes a request to download a plug-in search module onto the media device 902 (910). By allowing the server 903 to make the request, the user 901 does not need to make the request to download the plug-in search module. Furthermore, by allowing the server 903 to make the request, the plug-in search module for the server 903 can be provided when the user 901 is searching for the content on the server 903. Thus, in some embodiments, the plug-in search modules are only be stored on the media device 902 while the user 901 is searching for content on the server 903. When the user browses to a different content source, the plug-in search module can be unloaded and/or uninstalled from the memory of the media device 902.

In some embodiments, the request is made to the media device 902 (as shown in FIG. 9). In some embodiments, the request is made to the computer system that the user 901 uses to browse the content on the server 903 (not shown). The discussion below describes the embodiment where the request is made to the media device 902. However, it should be appreciated that operations 912-918 can be performed on the computer system that the user 901 uses to browse the content on the server 903.

The media device 902 receives the request to download the plug-in search module from the server 903 (912). The media device 902 then determines whether the acceptance parameters for downloading and installing plug-in search modules indicates that the user 901 is to be prompted before downloading and installing a plug-in search module (914). If the user 901 is to be prompted before downloading and installing a plug-in search module (914, yes), the media device 902 generates a prompt for the user 901. For example, the prompt can include "Do you want to download the plug-in search module for . . . "

The user 901 then responds to the prompt (916). If the response from the user 901 indicates that the user 901 has authorized the download of the plug-in search module, the media device 902 downloads the plug-in search module (920). In some embodiments, the plug-in search module is located on the server 903. In these embodiments, the media device 902 downloads the plug-in search module from the server 903. In some embodiments, the plug-in search module is located on another computer system. In these embodiments, the media device 902 determines the location of the plug-in search module (e.g., the location can be provided by the server 903, obtained from a search, etc.), and downloads the plug-in search module from the location. After downloading the plug-in search module, the media device 902 installs the plug-in search module (922).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for performing a contextual search to locate content associated with a media file, comprising:
   at a media device, receiving a request from a user to perform a contextual search based on a media file;
   determining a type of the media file;
   presenting a contextual search menu to the user, wherein the contextual search menu includes one or more contextual search query types, and wherein the one or more contextual search query types are based on the type of the media file;
   receiving from the user a selected contextual search query type selected from the one or more contextual search query types;
   querying one or more search modules, each associated with one or more content sources, to determine which one or more search modules can perform the selected contextual search query type;
   requesting that one or more search modules that can perform the selected contextual search query type perform the selected contextual search query against one or more selected content sources associated with the one or more search module;
   receiving search results from the one or more search modules, wherein the search results include links to one or more files associated with the one or more selected content sources; and
   displaying the search results to the user.

2. The method of claim 1, wherein prior to the requesting, the method includes:
   displaying to the user one or more content sources associated with the one or more search modules that can perform the selected contextual search query type; and
   receiving the selected content source from the user selected from the one or more content sources associated with the one or more search modules that can perform the selected contextual search query type.

3. The method of claim 1, including:
   receiving a user-selected search result from the search results obtaining one or more media files associated with the selected search result; and presenting the one or more media files to the user.

4. The method of claim 3, wherein the media file is obtained by the search module.

5. The method of claim 1, wherein the request to perform the contextual search based on the media file is received at a set-top box associated with a television set.

6. The method of claim 1, wherein the one or more search modules are plug-in search modules.

7. The method of claim 6, including:
   at the media device, receiving a request from the user to download a plug-in search module;
   determining a location of the plug-in search module;
   downloading the plug-in search module from the location; and
   installing the downloaded plug-in search module on the media device.

8. The method of claim 6, including:
   at the media device, receiving a request from a server to download a plug-in search module;
   determining a location of the plug-in search module;
   downloading the plug-in search module from the location; and
   installing the downloaded plug-in search module on the media device.

9. The method of claim 7, wherein including prompting the user with the option to install the plug-in search module prior to installing the downloaded plug-in search module.

10. The method of claim 1, wherein determining the type of the media file includes determining the type of the media file from metadata for the media file.

11. The method of claim 10, wherein the metadata for the media file is included with the media file.

12. The method of claim 10, wherein the metadata for the media file is included in data separate from the media file.

13. The method of claim 1,
    wherein querying one or more search modules includes querying all of the search modules on the media device; and
    wherein requesting that the one or more search modules that can perform the selected contextual search query type perform the selected contextual search query type includes requesting that all search modules that can perform the selected contextual search query type perform the selected contextual search query.

14. The method of claim 1, wherein the performing includes transmitting a search query to the selected content source, wherein the search query is based on attributes and corresponding values of the media file and the selected contextual search query type.

15. The method of claim 14, wherein the attributes of the media file are selected from the group consisting of:
    an artist name;
    an album name;
    a song name;
    an author name;
    a file name;
    a location;
    a category;
    a publication date;
    one or more metadata tags; and
    any combination of the aforementioned attributes.

16. The method of claim 1, wherein the one or more search modules are accessed through a common application programming interface (API).

17. The method of claim 1, wherein a respective content source is associated with at least one search module.

18. The method of claim 1, wherein a respective search result is selected from the group consisting of:
    an identification of the content source on which the respective media file was found;
    a title for a respective media file;
    a universal resource locator (URL) to the respective media file;
    a content type of the respective media file;
    an artist associated with the respective media file;
    an album associated with the respective media file;
    a category of the respective media file;
    a file name of the respective media file;
    a file size of the respective media file;
    a bit rate of the respective media file;
    a length of the respective media file;
    a representation of a rating of the respective media file;
    a representation of relevance of the respective media file to the search performed;
    an image which is associated with the respective media file; and
    any combination of the aforementioned fields.

19. The method of claim 1, wherein the media file is selected from the group consisting of:
    an audio file;
    a video file;

an image file;
a document; and
any combination of the aforementioned media files.

20. The method of claim 1, wherein the request to perform the contextual search is received from the user when the user is accessing the media file.

21. The method of claim 20, wherein the user accesses the media file using a set-top box.

* * * * *